(12) United States Patent
Thein et al.

(10) Patent No.: US 11,683,198 B2
(45) Date of Patent: Jun. 20, 2023

(54) METHOD FOR OPERATING A FIRST NETWORK DEVICE, FIRST NETWORK DEVICE, AND METHOD FOR OPERATING A COMMUNICATIONS NETWORK

(71) Applicant: Robert Bosch GmbH, Stuttgart (DE)

(72) Inventors: Christoph Thein, Hildesheim (DE); Hugues Narcisse Tchouankem, Hemmingen (DE); Marie-Theres Suer, Braunschweig (DE); Oscar Dario Ramos Cantor, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/160,592

(22) Filed: Jan. 28, 2021

(65) Prior Publication Data
US 2021/0243048 A1 Aug. 5, 2021

(30) Foreign Application Priority Data
Jan. 31, 2020 (EP) ..................... 20154865

(51) Int. Cl.
*H04L 12/40* (2006.01)
(52) U.S. Cl.
CPC .. *H04L 12/40071* (2013.01); *H04L 12/40013* (2013.01); *H04L 12/40065* (2013.01)
(58) Field of Classification Search
CPC ......... H04L 12/40071; H04L 12/40013; H04L 12/40065; H04L 47/41; H04L 47/626; H04L 47/6295; H04L 47/24; H04W 28/0236; H04W 28/065; H04W 76/14; H04W 28/08; H04W 88/06; H04W 28/16; H04W 24/08; H04W 40/02; H04W 40/12
See application file for complete search history.

(56) References Cited

U.S. PATENT DOCUMENTS 8,144,711 B1 * 3/2012 Pegrum ................... H04L 45/24
370/394
10,904,790 B2 * 1/2021 Lee ........................ H04W 28/08
(Continued)

FOREIGN PATENT DOCUMENTS

| DE | 102017218316 A1 | 1/2019 | |
|---|---|---|---|
| EP | 3079293 A1 | 10/2016 | |
| WO | WO-2021089136 A1 * | 5/2021 | ............. H04L 45/24 |

*Primary Examiner* — Kibrom T Hailu
(74) *Attorney, Agent, or Firm* — Michael Best & Friedrich LLP

(57) ABSTRACT

A method for operating a first network device of a communications network, wherein the method comprises: determining or receiving, by means of an ingress interface, an ingress data stream comprising payload data to be transmitted towards a second network device; determining or receiving, by means of a correlation observer, at least one correlation value for a plurality of communication paths between the first network device and the second network device, wherein each of the plurality of communication paths comprises a different one of a plurality of physical channels; determining, by means of a multi-connectivity controller, a plurality of egress data streams in dependence on the at least one correlation value and in dependence on the ingress data stream; and transmitting, via a respective one of a plurality of egress queues, wherein each egress data stream is associated with a different one of the plurality of paths.

7 Claims, 6 Drawing Sheets

(56) References Cited

U.S. PATENT DOCUMENTS

| | | | |
|---|---|---|---|
| 2005/0083848 A1* | 4/2005 | Shao | H04L 45/123 370/461 |
| 2008/0168356 A1* | 7/2008 | Eryurek | G05B 23/0272 715/736 |
| 2013/0266005 A1 | 10/2013 | Pegrum et al. | |
| 2013/0286942 A1* | 10/2013 | Bonar | H04L 45/24 370/328 |
| 2015/0381469 A9* | 12/2015 | Malik | H04L 12/2838 370/389 |
| 2016/0226769 A1* | 8/2016 | McCormick | H04L 29/06517 |
| 2020/0014474 A1* | 1/2020 | Khirallah | H04W 24/10 |
| 2020/0107213 A1* | 4/2020 | Park | H04L 12/1407 |
| 2020/0112363 A1* | 4/2020 | Roy | H04L 45/24 |
| 2020/0112472 A1* | 4/2020 | Fonseca De Oliveira | H04L 45/24 |
| 2020/0389877 A1* | 12/2020 | Tang | H04L 1/08 |
| 2021/0092062 A1* | 3/2021 | Dhanabalan | H04L 43/087 |
| 2021/0167907 A1* | 6/2021 | Ding | H04L 5/0032 |
| 2021/0250139 A1* | 8/2021 | Zhang | H04L 5/0053 |
| 2021/0251031 A1* | 8/2021 | Zhang | H04L 1/22 |

* cited by examiner

METHOD FOR OPERATING A FIRST NETWORK DEVICE, FIRST NETWORK DEVICE, AND METHOD FOR OPERATING A COMMUNICATIONS NETWORK

BACKGROUND OF THE INVENTION

The invention is directed to a method for operating a first network device, a first network device, and a method for operating a communications network.

Known multi-connectivity systems for example in 3GPP use only packet duplication to increase reliability of the transmission. Examples of existing multi-connectivity schemes are Multipath-TCP or Dual-Connectivity in 3GPP. In the literature schemes are proposed to base the path selection in Multi-Connectivity scenarios on the correlation between the paths and use uncorrelated paths for redundant scheduling [0]. However, current multi-connectivity schemes do not consider the paths' correlation for the scheduling decision.

SUMMARY OF THE INVENTION

A first aspect of the description is directed to a method for operating a first network device of a communications network, wherein the method comprises: determining or receiving, by means of an ingress queue, an ingress data stream comprising payload data to be transmitted towards a second network device; determining or receiving, by means of a correlation observer, at least one correlation value for a plurality of communication paths between the first network device and the second network device, wherein each of the plurality of communication paths comprises a different one of a plurality of physical wireless channels; determining, by means of a multi-connectivity controller, a plurality of egress data streams in dependence on the at least one correlation value and in dependence on the ingress data stream; and transmitting, via a respective one of a plurality of egress queues, wherein each egress data stream is associated with a different one of the plurality of paths.

Advantageously the use of the correlation value for the multi-connectivity scheduling decision improves the overall performance in terms of reliability, latency and efficient resource utilization. The performance of wireless communication systems is enhanced in terms of a combined latency and reliability metric while increasing the efficiency of radio resource utilization. Accordingly, the information about the correlation between the utilized links via the physical wireless channels is exploited. This information is used to select different multi-connectivity scheduling schemes to improve overall performance and increase the efficiency in resource utilization.

An advantageous example is characterized in that the determination of the plurality of egress data streams comprises: selecting, by means of the multi-connectivity controller, dividing or duplicating the payload data, wherein the dividing comprises a determination of mutually different segments of the payload data, wherein the mutually different segments are distributed between the plurality of egress streams, wherein the duplicating comprises a determination of duplicate segments of the payload data, wherein the duplicate segments are fed into each one of the plurality of egress data streams.

The division of payload data into segments provides the advantage of a lower transmission latency, the duplication of payload data into duplicate segments increases the transmission reliability.

Advantageously the use of the combination of scheduling and rate adaptation improves the overall performance in terms of reliability and latency.

An advantageous example is characterized in that the determination of the plurality of egress data streams comprises selecting the division of payload data if the correlation value indicates that the plurality of communication paths are correlated.

Mean and tail latency are improved by selecting the division scheme. A robust multi-connectivity transmission scheme is established.

An advantageous example is characterized in that the determination of the plurality of egress data streams comprises selecting the duplication of payload data if the correlation value indicates that the plurality of communication paths are uncorrelated.

By selecting the duplication scheme, mean and tail latency are improved. Furthermore, the reliability is increased.

An advantageous example is characterized in that the method comprises: receiving or determining a QoS-requirement for the payload data; and determining the plurality of egress data streams in dependence on the QoS-requirement.

Therefore, an application may indicate its communication requirements via the QoS-requirement.

An advantageous example is characterized in that the at least one correlation indicator is determined based on latency measurements for the plurality of physical wireless channels.

Studies of the applicant reveal that the latency has a strong impact on the performance of different multi-connectivity schemes like division or duplication of data.

An advantageous example is characterized in that the method comprises: receiving or determining a/the QoS-requirement for the payload data; and determining and applying, by means of the multi-connectivity controller, at least one configuration parameter for each communication path in dependence on the QoS-requirement and in dependence on the correlation value.

Advantageously, the communications paths are adapted to the QoS-requirement by incorporating the observed correlation value of the plurality of paths. Therefore, the adaption of the paths, in particular single components of the paths, are adapted in order to fulfill the QoS-requirements.

An advantageous example is characterized in that the method comprises: determining a QoS fulfillment indicator in dependence on a/the QoS-requirement and in dependence on the correlation value, wherein the QoS fulfillment indicator indicates whether the available communication paths are capable to fulfill the QoS-requirement.

Advantageously, the QoS fulfillment indicator provides a means for an application to decide whether to transmit the payload or not.

A further aspect of the description is directed to a first network device of a communications network, wherein the first network device is configured to: determine or receive, by means of an ingress queue, an ingress data stream comprising payload data to be transmitted towards a second network device; determine, by means of a correlation observer, at least one correlation value for a plurality of communication paths between the first network device and the second network device, wherein each of the plurality of communication paths comprises a different one of a plurality of physical wireless channels; determine, by means of a multi-connectivity controller, a plurality of egress data streams in dependence on the at least one correlation value and in dependence on the ingress data stream; and transmit, via a respective one of a plurality of egress queues, the plurality of egress data streams, wherein each egress data stream is associated with a different one of the plurality of paths.

A third aspect of the description is directed to a method for operating a communications network comprising the first network device according to the second aspect and the second network device.

DETAILED DESCRIPTION

Figure 1:
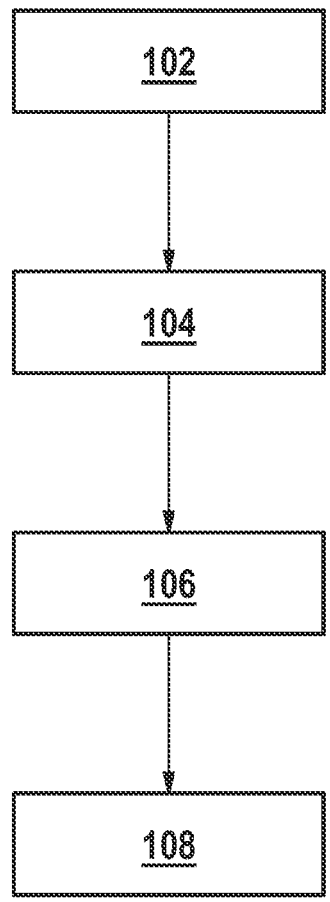
FIG. 1 schematically depicts a sequence diagram.

FIG. 1 schematically depicts a sequence diagram for operating a first network device of a communication network. According to a step 102, an ingress data stream is received or determined, wherein the ingress data stream comprises payload data to be transmitted towards a second network device.

According to a step 104 at least one correlation value for a plurality of communication paths between the first network device 100 and the second network device 200 is received or determined, wherein each of the plurality of communication paths comprises a different one of a plurality of physical wireless channels. For example, if the same frequency is used for the provision of multi-connectivity, the different physical channels are provided on same channel frequency but with spatial diversity.

In a step 106 a plurality of egress data streams are determined in dependence on the at least one correlation value and in dependence on the ingress data stream.

According to a step 108, the plurality of egress data streams are transmitted, wherein each egress data stream is associated with a different one of the plurality of paths.

Figure 2:
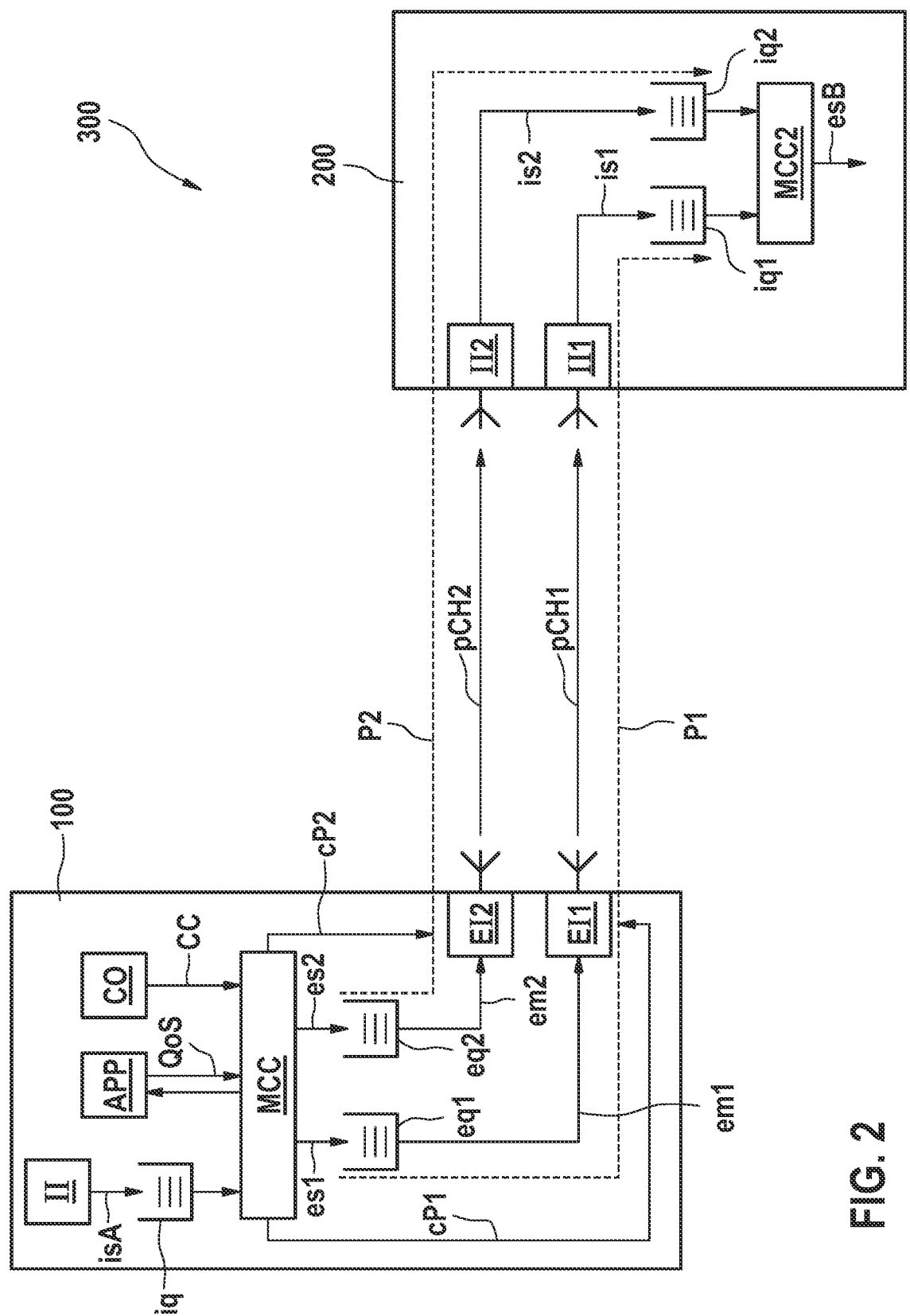
FIGS. 2 and 3 each schematically depict a communications network.

FIG. 2 schematically depicts an example of the communications network 300.

By means of an ingress interface ii, an ingress data stream isA is received or determined comprising the payload data to be transmitted towards the second network device 200. The first network device 100 can determine the ingress data stream isA itself or serve as a scheduler for the transmission of the payload data by receiving the ingress data stream isA.

By means of a correlation observer CO, the at least one correlation value CC for the plurality of communication paths P1, P2 between the first network device 100 and the second network device 200. Each of the plurality of communication paths P1, P2 comprises a different one of a plurality of physical wireless channels pCH1, pCH2. The correlation observer CO can be accommodated in the MCC of the first network device or in a remote network device.

For example, the at least one correlation indicator CC is determined based on latency measurements for the plurality of physical wireless channels pCH1, pCH2. A history of latency measurements is analyzed in order to determine the correlation indicator CC. Further examples to determine the correlation indicator CC are based on measurements of round trip times of test packets between the first and second network device 100, 200. The correlation indicator CC is for example the Pearson correlation coefficient.

In another example, the at least one correlation indicator CC is determined based on loss or other metric. Even a combined correlation indicator CC build from a plurality of further correlation indicators is possible.

The physical wireless channels pCH1 and pCH2 differ for example at least in transmission technology like Wi-Fi and LTE. According to a further example, the physical wireless channels pCH1 and pCH2 differ at least in the transmitting and/or receiving antennas. In another example, the physical wireless channels pCH1 and pCH2 differ in at least frequency.

By means of a multi-connectivity controller MCC, the plurality of the egress data streams es1, es2 are determined in dependence on the at least one correlation value CC and in dependence on the ingress data stream isA.

The multi-connectivity controller MCC selects a division or duplication of the payload data. The multi-connectivity controller MCC selects the division of payload data if the correlation value CC indicates that the plurality of communication paths P1, P2 are correlated. The multi-connectivity controller MCC selects the duplication of payload data if the correlation value CC indicates that the plurality of communication paths P1, P2 are uncorrelated.

In other words, based on path correlation level provided by the correlation observer CO, the multi connectivity controller MCC chooses the appropriate packet scheduling scheme, which could be one of following strategies: Packet duplication (PD): A packet is duplicated and its copy is sent on each path, or Packet splitting (PS): A packet is broke into smaller pieces (fragments) and each fragment is sent on one path.

The dividing comprises a determination of mutually different segments of the payload data, wherein the mutually different segments are distributed between the plurality of egress streams eq1, eq2.

The duplication comprises a determination of duplicate segments of the payload data, wherein the duplicate segments are fed into each one of the plurality of egress data streams eq1, eq2.

The multi-connectivity controller MCC determines a QoS-requirement QoS for the payload data or received the QoS-requirement QoS from an application APP. The multi-connectivity controller MCC determines the plurality of egress data streams es1, es2 in dependence on the QoS-requirement QoS. The QoS-requirement QoS indicates a requirement for the transmission of the payload data with regard to at least one of: latency, transmission data rate, etc.

The QoS-requirement QoS for the payload data is received from the application APP or determined by the multi-connectivity controller MCC itself. The multi-connectivity controller MCC determines and applies at least one configuration parameter cP1, cP2 for each communication path P1, P2 in dependence on the QoS-requirement QoS and in dependence on the correlation value CC.

For example, the configuration parameter cP1, cP2 comprise a transmission data rate for each path P1, P2, which is achieved by configuring the egress queues eq1, eq2 and the egress interfaces EI1, EI2. In an alternative or additional example, the configuration parameters cP1, cP2 comprise a modulation and coding scheme, a sub-channel, a transmission power or other configurable parameters of the egress interfaces EI1, EI2 of the first network device 100 and the ingress interfaces II1, II2 of the second network device 200.

The multi-connectivity controller MCC determines a QoS fulfillment indicator QoSi in dependence on a/the QoS-requirement QoSi and in dependence on the correlation value CC. The QoS fulfillment indicator QoSi indicates whether the available communication paths P1, P2 are capable to fulfill the QoS-requirement QoS.

Via a respective one of the plurality of egress queues eq1, eq2, the plurality of egress data streams es1, es2 are transmitted, wherein each one of the egress data stream es1, es2 is associated with a different one of the plurality of paths P1, P2.

The egress interfaces EI1, EI2 takes an egress packet em1, em2 from the respective egress queue eq1, eq2 and transmits the egress packet em1, em2 via the physical wireless channel pCH1, pCH2 to the second network device 200.

At the receiving second network device 200, a respective ingress interface II1, II2 receives an ingress packet is1, is2 corresponding to the egress packet em1, em2. The ingress queues iq1 and iq2 receive the associated one of the ingress packets is1 and is2.

A further multi-connectivity manager MCC2 determines an egress data stream esB in dependence on the received ingress packets is1 and is2. The ingress packets is1 and is2 comprise a reconstruction indicator, which defines how the multi-connectivity manager MCC2 constructs the single packets of the egress data stream esB. Accordingly, the reconstruction indicator is inserted into the single egress packets em1, em2 of the egress data streams es1 and es2 by the multi-connectivity manager MCC of the first network device 100 in dependence on the selected scheduling scheme. The second network device 200 provides the egress data stream esB representing the ingress data stream isA of the first network device 100.

In the example, the communication path P1, P2 comprises the egress queue eq1, eq2, the egress interface EI1, EI2, the physical wireless channel pCH1, pCH2, the ingress interface II1, II2, and the ingress queues iq1, iq2. Of course, further queues, channels and interfaces can be part of the respective path P1 or P2. In FIG. 2 only a simple example of the network devices 100, 200, which comprise the interfaces EI1, EI2, II1, II2 to attend the physical wireless channels pCH1 and pCH2, are shown. Other examples of the network devices 100, 200 may comprise interfaces to wired channels leading to another device with a radio interface, therefore extending the paths P1, P2 as shown.

Figure 3:
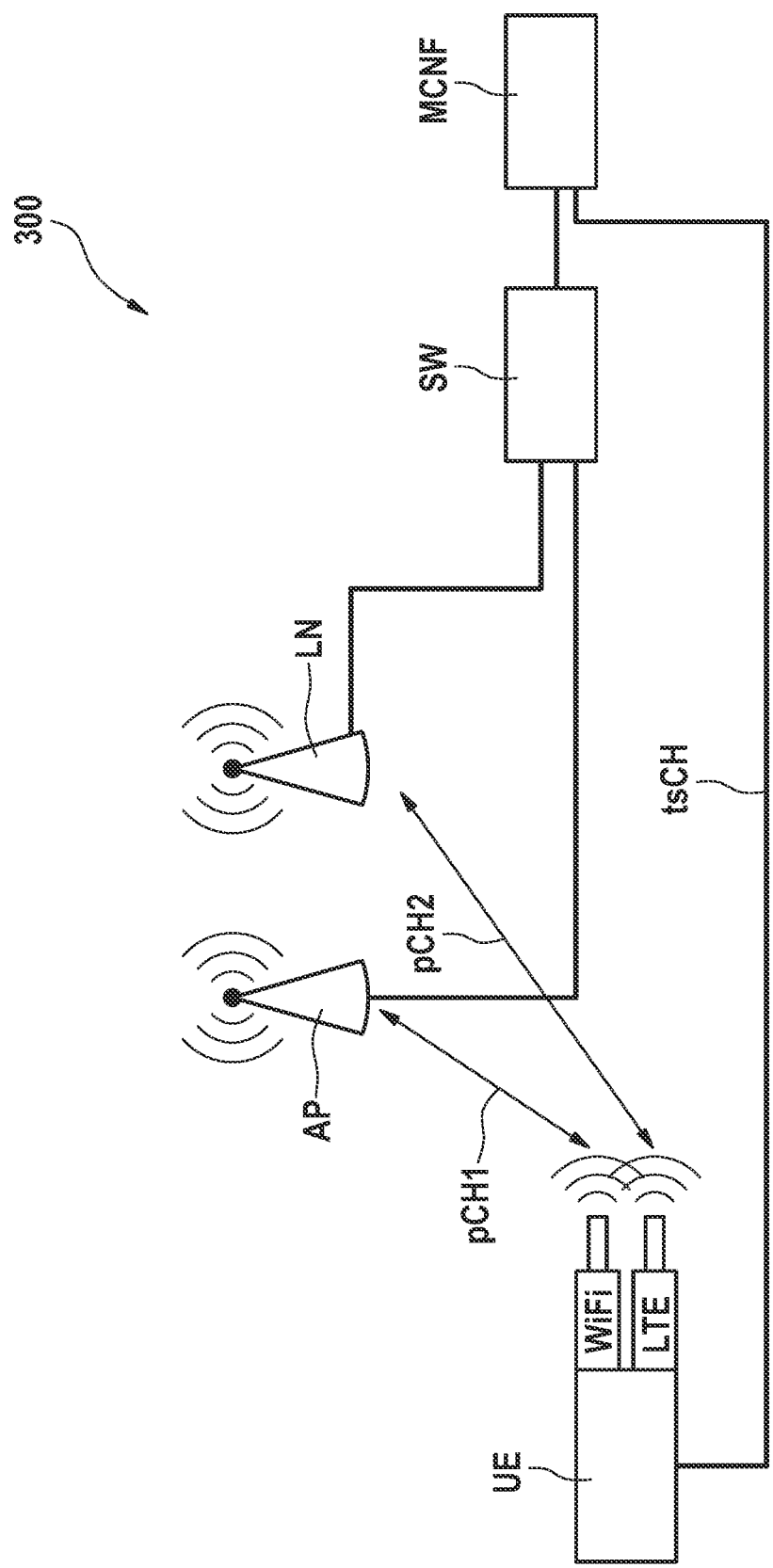

FIG. 3 schematically depicts an example of the communications network 300. In the example, a mobile user like a user equipment UE, wherein the mobile user comprises two radio interfaces Wi-Fi and LTE according to different radio technologies and/or radio standards. A multi-connectivity network function MCNF is connected via a switch SW to a Wi-Fi capable access point AP and an LTE capable network LN.

Therefore, different physical wireless channels pCH1 and pCH2 are available on communication paths between the user equipment UE and the multi-connectivity network function MCNF.

In order to measure latency along the communication paths, a logical time synchronization channel tsCH is established between the user equipment UE and the multi-connectivity network function MCNF.

In another example not shown, the communication network comprises two different physical wireless channels of corresponding paths. Two Wi-Fi access points (APs) operate on different frequencies and are connected to a second network device with two Wi-Fi network interface cards (NICs). The APs are connected to a central multi-connectivity controller and the UE/client has a local multi-connectivity controller. In Downlink (DL) operation, the central multi-connectivity controller applies the scheduling decision. The client multi-connectivity controller on the client side receives the data from the different paths and processes the data such that the multi-connectivity scheme is transparent to the application. More specifically, the client selects one copy of the packet in case of PD and assembles the packet fragments in case of PS. A flag/indicator in the packet header specifies the information, which one of the scheduling schemes is applied. Therefore, the multi-connectivity controller on the client side knows which operation to perform on the packets to provide the egress data stream.

In another example not shown, the communication network comprises two network devices which together form an adhoc network via at least two wireless physical channels without the use of an access point.

Figure 4:
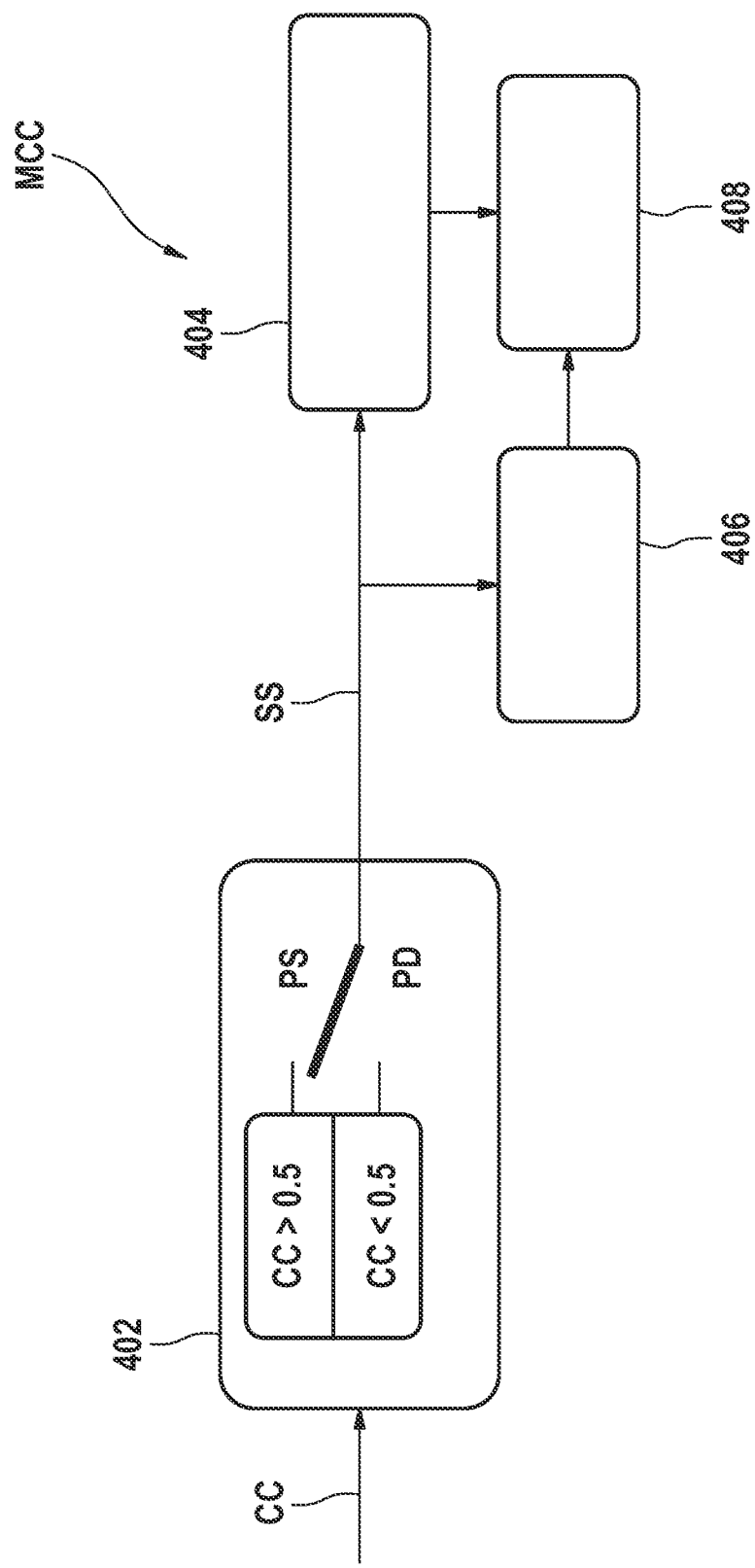
FIG. 4 schematically depicts a multi-connectivity controller.

FIG. 4 schematically depicts the multi-connectivity controller MCC. A decision block 402 selects duplication PD or segmentation PS as a scheduling scheme ss. The decision is based on the correlation value CC and a corresponding threshold, for example 0.5. If a low correlation exists between the communication paths, packet duplication (PD) is used, whereas in case of a high correlation between the paths, packet splitting (PS) or packet segmentation is chosen.

According to an example, the decision block selects to not use a multi-connectivity scheduling scheme, if a resource indicator indicates that it would be not resource efficient.

According to the selected scheduling scheme ss, a packet inspector 404 applies the selected scheduling scheme ss to the inspected packet. The inspected packet is inserted into the corresponding egress queue or is segmented in new packets, wherein the new packets are inserted into the corresponding egress queue.

According to the selected scheduling scheme ss, a configurator 406 selects the corresponding path configuration, for example the transmission rate of the respective path.

According to a transmission block 408, the packets in the egress queues are transmitted towards the second network device.

For example, the application's QoS-requirements are used as additional input. The multi-connectivity controller MCC stores a history of previous packets including reception and/or transmission time. Based on this history the multi-connectivity controller MCC determines latency-reliability-curves for different communication paths. The multi-connectivity controller MCC chooses the scheduling scheme that fulfils the latency requirements of the application (QoS requirement) and offers an increased reliability.

Multi-connectivity at the physical layer can be achieved by different means. One alternative is by transmitting the application information from multiple independent antennas to a client in the downlink. For example, even if two access points or antennas send information over the same physical resources to a client, the paths are considered to be the different. When dealing with multi-connectivity at the PHY layer, the multi-connectivity controller MCC decides to apply PD if the paths are correlated, with e.g., CC>0.5. This decision is made because it is not possible, at PHY layer, to distinguish among different packets when the communication paths' correlation is high. On the other hand, if the correlation between the communication paths is low, e.g., CC<0.5, the multi-connectivity controller MCC has the degree of freedom to decide whether to use PS or PD. For the final decision, the additional information about the QoS requirements of the application is used. If reliability is relevant, PD is used at the cost of lower throughput. PS is selected as the scheduling scheme if high data rate is required.

Figure 5:
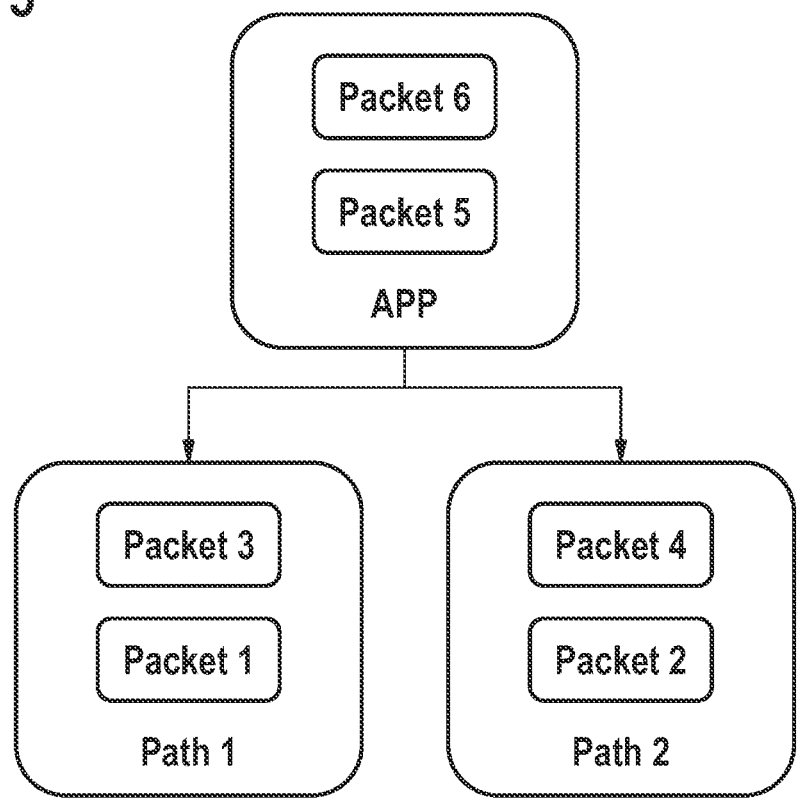
FIGS. 5 to 7 each schematically depict a scheduling scheme.
Figure 6:
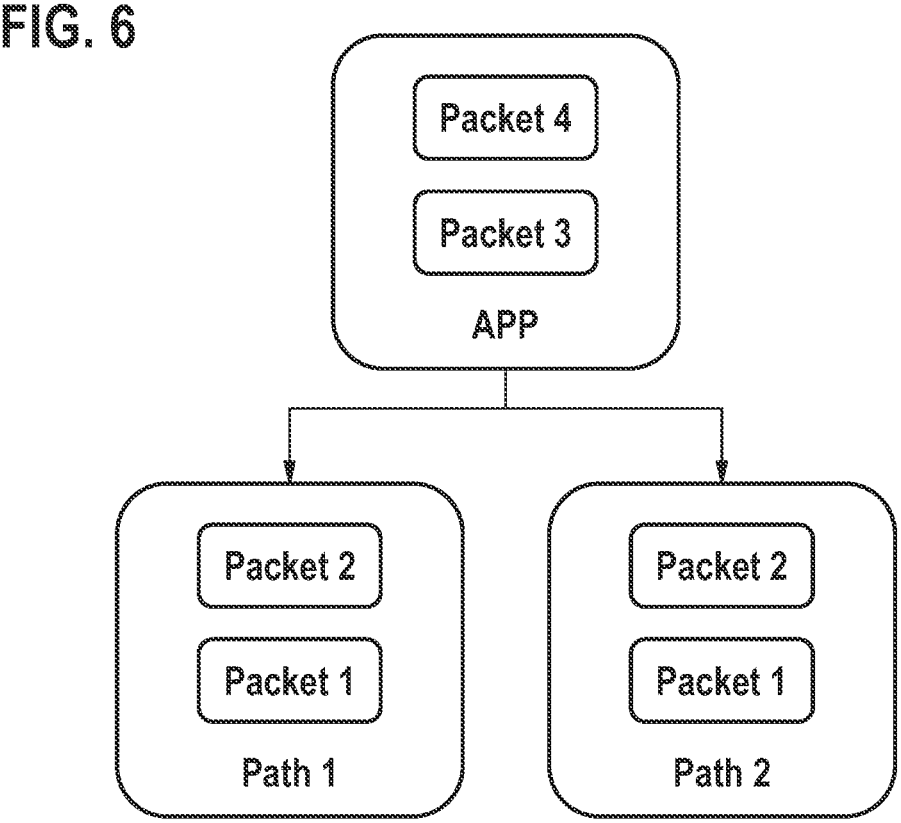
Figure 7:
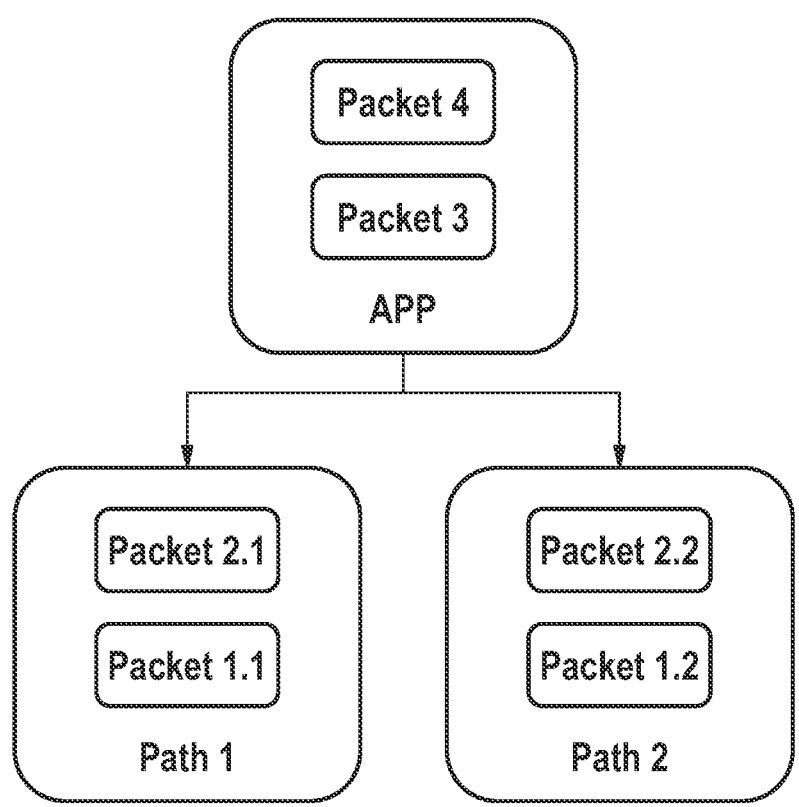

Each one of the FIGS. 5 to 7 schematically depicts a different scheduling scheme. FIG. 5 shows a load-balancing scheme, where the ingress data stream comprises packets, which are directed to the different paths alternatingly. FIG. 6 shows a packet duplication scheme, where each path receives a duplicate packet of the ingress data stream. FIG. 7 shows a packet-splitting scheme, where each packet of the ingress stream is split up in a first and second part. The first and second part are directed to different paths. When the multi-connectivity controller selects dividing of the payload data, then the scheduling scheme of FIG. 5 or 7 is selected. When the multi-connectivity controller selects the duplicating of the payload data, then the scheduling scheme of FIG. 6 is selected.

The invention claimed is:

1. A method for operating a first network device of a communications network, the method comprising:
   ascertaining, by means of an ingress interface, an ingress data stream comprising payload data to be transmitted towards a second network device;
   determining, by means of a correlation observer, at least one correlation value for a plurality of communication paths between the first network device and the second network device, wherein each of the plurality of communication paths comprises a different one of a plurality of physical channels and wherein the at least one correlation value is determined based on the measure of linear correlation between two loss measurements for the plurality of physical channels;
   determining, by means of a multi-connectivity controller, a plurality of egress data streams in dependence on the at least one correlation value and in dependence on the ingress data stream, wherein determining the plurality of egress data streams includes selecting, by means of the multi-connectivity controller, dividing or duplicating the payload data, wherein selecting the division of payload data occurs when the correlation value indicates that the plurality of communication paths are correlated and wherein selecting the duplication of payload data occurs when the correlation value indicates that the plurality of communication paths are uncorrelated; and
   transmitting, via a respective one of a plurality of egress queues, the plurality of egress data streams, wherein each egress data stream is associated with a different one of the plurality of paths.

2. The method according to claim 1,
   wherein the dividing comprises a determination of mutually different segments of the payload data, wherein the mutually different segments are distributed between the plurality of egress streams,
   wherein the duplicating comprises a determination of duplicate segments of the payload data, wherein the duplicate segments are fed into each one of the plurality of egress data streams.

3. The method according to claim 1, wherein the method comprises:
   ascertaining a QoS-requirement for the payload data; and
   determining the plurality of egress data streams in dependence on the QoS-requirement.

4. The method according to claim 1, wherein the at least one correlation indicator is determined based on latency measurements for the plurality of physical channels.

5. The method according to claim 1, wherein the method comprises:
   ascertaining a QoS-requirement for the payload data; and
   determining and applying, by means of the multi-connectivity controller, at least one configuration parameter for each communication path in dependence on the QoS-requirement and in dependence on the correlation value.

6. The method according to claim 1, wherein the method comprises:
   determining a QoS fulfillment indicator in dependence on a/the QoS-requirement and in dependence on the correlation value, wherein the QoS fulfillment indicator indicates whether the available communication paths are capable to fulfill the QoS-requirement.

7. A first network device of a communications network, wherein the first network device is configured to:
   ascertain, by means of an ingress queue, an ingress data stream comprising payload data to be transmitted towards a second network device;
   determine, by means of a correlation observer, at least one correlation value for a plurality of communication paths between the first network device and the second network device, wherein each of the plurality of communication paths comprises a different one of a plurality of physical channels and wherein the at least one correlation value is determined based on the measure of linear correlation between two loss measurements for the plurality of physical channels;
   determine, by means of a multi-connectivity controller, a plurality of egress data streams in dependence on the at least one correlation value and in dependence on the ingress data stream, wherein determining the plurality of egress data streams includes selecting, by means of the multi-connectivity controller, dividing or duplicating the payload data, wherein selecting the division of payload data occurs when the correlation value indicates that the plurality of communication paths are correlated and wherein selecting the duplication of payload data occurs when the correlation value indicates that the plurality of communication paths are uncorrelated; and
   transmit, via a respective one of a plurality of egress queues, the plurality of egress data streams, wherein each egress data stream is associated with a different one of the plurality of paths.

* * * * *